Jan. 18, 1927. 1,615,019
A. J. LIEBENBERG
MOTOR CONTROLLER
Filed Dec. 7, 1923   4 Sheets-Sheet 3
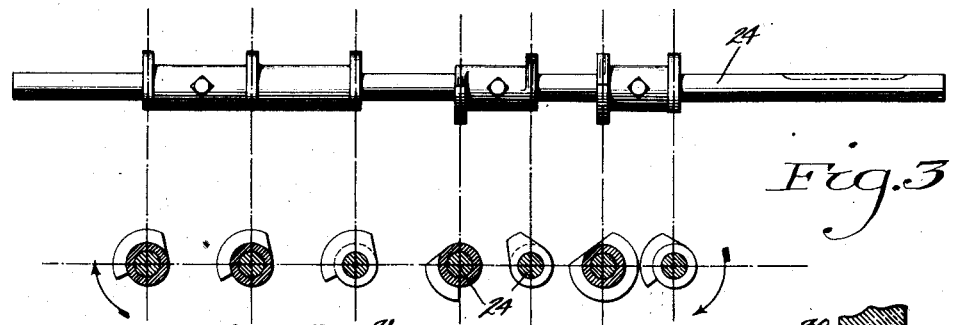
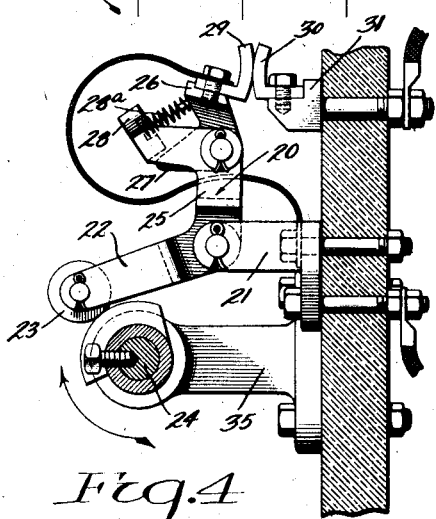
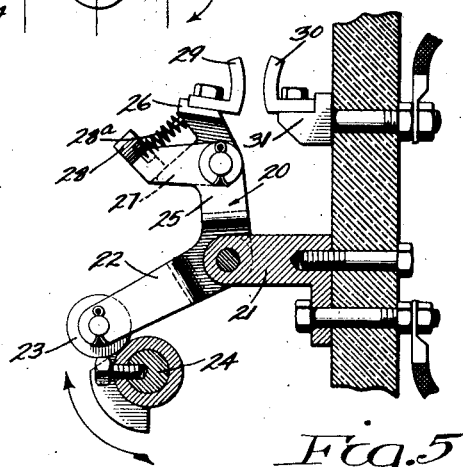
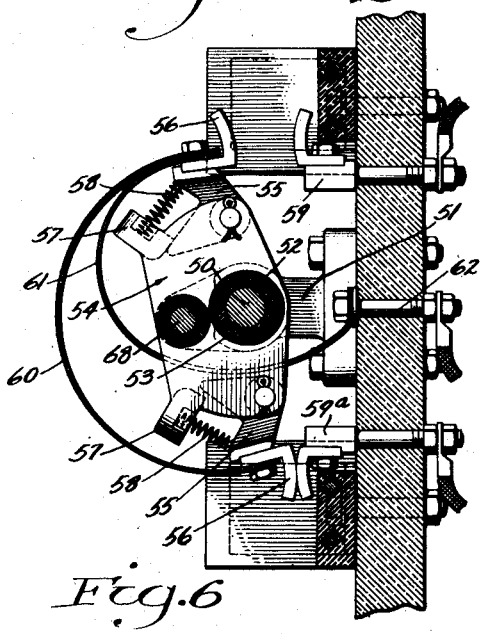
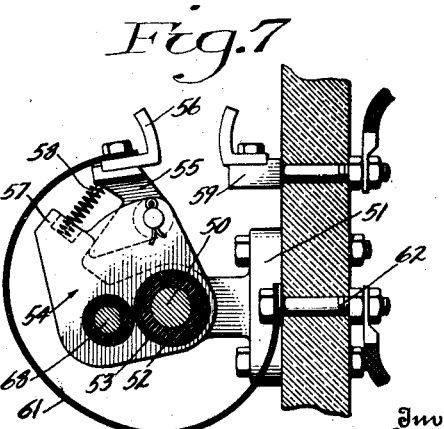
Inventor
Arthur J. Liebenberg
By Wood & Wood
Attorneys Jan. 18, 1927.

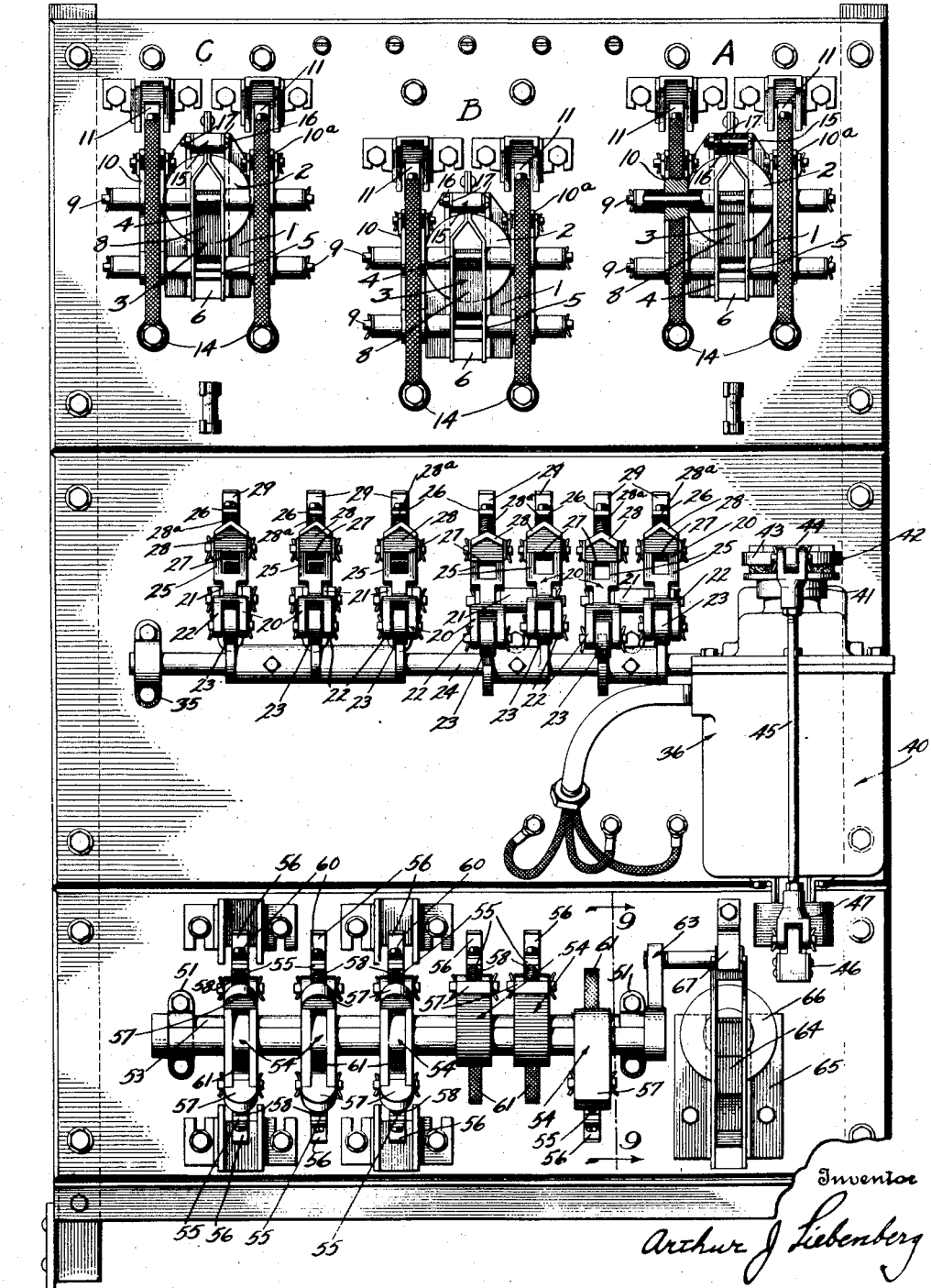

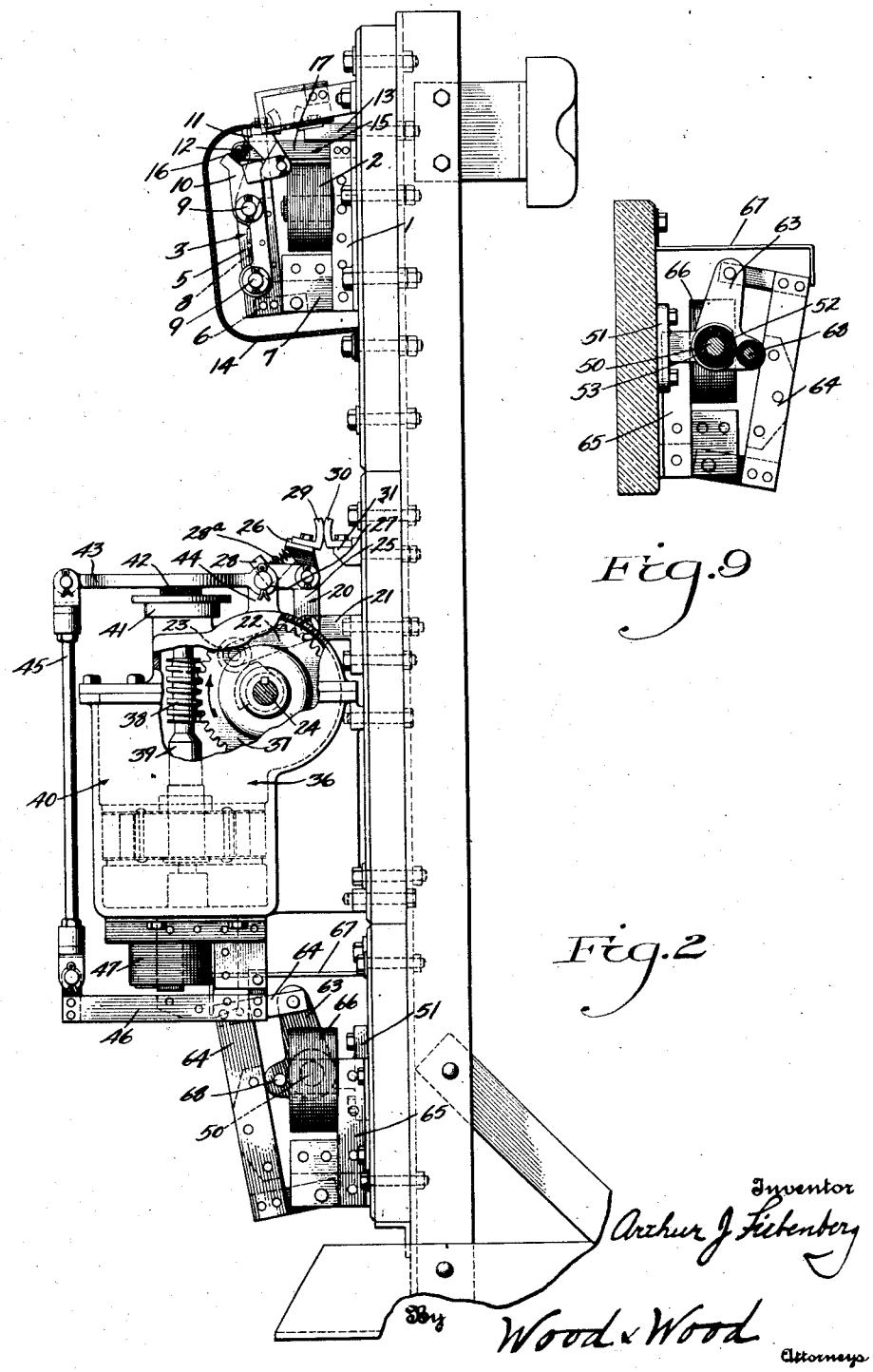

A. J. LIEBENBERG 1,615,019

MOTOR CONTROLLER

Filed Dec. 7, 1923   4 Sheets-Sheet 4

Inventor
Arthur J. Liebenberg
By Wood & Wood
Attorneys

Patented Jan. 18, 1927.

1,615,019

UNITED STATES PATENT OFFICE.

ARTHUR J. LIEBENBERG, OF CINCINNATI, OHIO, ASIGNOR TO THE WARNER ELEVATOR MANUFACTURING COMPANY, OF CINCINNATI, OHIO, A CORPORATION OF OHIO.

MOTOR CONTROLLER.

Application filed December 7, 1923. Serial No. 679,221.

This invention relates to electric motor controller primarily for elevator service and in connection with varying or plural speed motors.

The controller generally is employed in connection with what is known as a reconnected two speed alternating current motor, although the controller is adaptable for other types of motors. For the particular type the motor can be started upon low speed under load without a starting resistance and is also susceptible for quick reversing. This considerably simplifies the controller devices, and the controller mechanism herein is principally directed for a motor control from one running speed to a second, and preventing a quick reverse of motor direction when running at the higher speed.

An object of the invention is to provide a motor controller requiring the controller devices to be in a motor starting position before the motor can be operated for any speed, and whereby the motor circuit must be established for one or low speed before it is possible to obtain a second or high speed, and for the automatic control of resistance when required in making the change from one motor speed to a second.

Another object of the invention is to provide a controller for motor reversing which will require the slowing down in the motor speed before it is possible to effect a change in motor direction.

The controller is operated automatically with the operation of a manually actuated service switch and any timing or governing requirements for the motor beyond the control of the operator, for increasing the efficiency and life of the motor; in this connection the present system possesses characteristics common with a system of control for a single speed type of motor requiring a starting resistance which is cut out as the motor accelerates, made the subject matter of a separate application filed and copending herewith, Serial No. 679,220.

Other objects and features will be more fully set forth in the following description of the accompanying drawings forming a part hereof, in which:

Figure 1 is a front view of a panel board of a controller containing my improvements for a re-connected two speed alternating current motor, the panel board being divided into three sections, the top or upper section containing the main circuit reversing switches magnetically operated, the second section, a plurality of mechanically operated switches actuated by a cam shaft and pilot motor for motor starting resistance and the system reinstatement control and the third section a plurality of mechanically operated switches actuated by a magnet for motor speed change control.

Figure 2 is an end view of the panel board shown in Figure 1, with a portion of the pilot motor casing cut away to show the gearing connecting the motor shaft with the cam shaft.

Figure 3 combines a plan and sectional views of the cam shaft illustrating the relative positions of the cams.

Figure 4 is an enlarged detail side elevation of one of the cam operated switches in closed position.

Figure 5 is a view similar to Figure 4 showing the switch in open position.

Figure 6 is an enlarged detail side elevation of one of the motor speed controlling switches of one type.

Figure 7 is a similar view of a second type operative in conjunction with the switches of the first type shown in Fig. 6.

Figure 9 is a sectional view taken on line 9—9, of Fig. 1.

Figure 8:
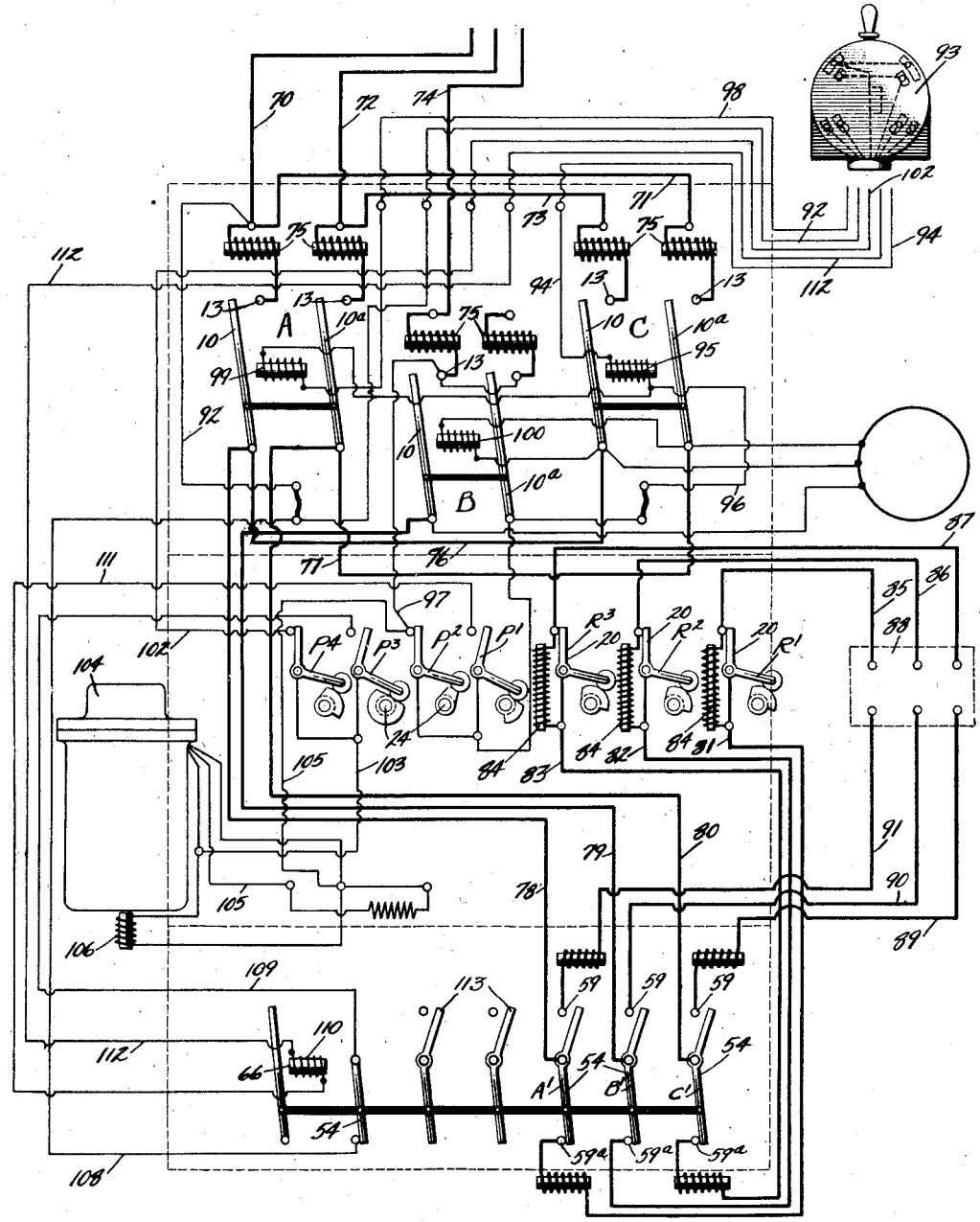
Figure 8 is a panel wiring diagram primarily for elevator service.

The controller is primarily adapted for elevator service in connection with a two speed alternating current motor for obtaining low and high motor speed service. The development of the two speed alternating current motor for elevator service has been limited to some extent by the difficulties encountered in the control of the equipment. The controller is designed and adjusted to work in conjunction with a particular type of two speed motor, the features of the motor forming the subject matter of a separate invention possessing characteristics which enables the elimination of many parts and devices for elevator control such as centrifugal switches, sequence relays, pilot contactors and other devices required as controller of the general types of motors.

The controller board for general convenience is divided into three panels or sections. The upper panel carrying three main line contactors or switches, two of which operate for each direction of travel. The contactors are electro-magnetically operated by means of a self-centering service switch in the car.

The center panel carries motor operated rheostat and interlock contactors or switches. When the selected main switches are closed, the motor on this panel is energized and rotates a cam shaft so that after a predetermined period of time has elapsed, it becomes possible for the operator to attain the high speed. It is possible for the operator to run on the high speed or low speed at will, but it is necessary to allow the car to come to rest before the main switches can be operated for the reverse direction.

The lower panel carries the multipolar switch devices, employed to change the motor connections from the low to the high speed when the operating magnet is energized and from high to low when the car switch is moved to the low speed position. This switch is rapid in operation and there is no perceptible jerk or jar when the speed is changed.

All contacts are of the rolling butt type, copper to copper, and where the main line current is broken, these contacts are equipped with magnetic blow-outs, which suppress all arcing and burning.

*Main switches.*

The main switches indicated A, B, and C, and mounted upon the upper section of the panel board are the duplicate of each other in structure, each in the preferred form illustrated comprising, a base 1 suitably bolted to the panel board, and to which is fixed a single core magnet 2. A fabricated armature lever 3 consisting of two spaced plates 4, 5, bent at one end toward each other for a lap joint connection, the opposite ends connected to an intermediate spacer block 6 extending at an angle therefrom, and pivotally connected and between a pair of bracket plates 7—7 fixed to the base 1. A laminated armature 8 is fixed to the lever between the plates 4, 5, for attracting the lever toward the core end of the magnet when the magnet is energized. The armature lever carries a pair of spaced parallel cross rods 9—9 extending from opposite sides of the lever upon which are mounted contact carrying arms or contactors 10, 10ª, the arms being suitably insulated from the rods by insulation sleeves and collars. Each arm at one end pivotally supports a spring pressed contact element 11, a spring 12 being interposed between the contact element and an extending lip of the arm. The contact element has a curved end for engagement with the curved end of a stationary contact element 13 fixed to the panel board. The contacts therefore are of what is known as rolling butt type, metal to metal. A flexible conduction strap 14 at one end is fixed to the panel board by a terminal screw bolt and its opposite end to the contact movable element 11 carried by the armature lever. The armature lever at its upper end engages a stop bar 15, and as shown in detail Fig. 1 comprises a collar insulated upon a screw bolt 16 secured to a pair of uprights 17. The armature lever engages with the collar when at the limit of a detracted position.

*Motor rheostat controlling and pilot switches.*

The switches for pilot and rheostat control employed in the present system are of approximate duplicate construction, and seven in number, so that a description of one will suffice for all except as to such details which are expressly enumerated, as for instance the rheostat controlling switches are mounted in pairs upon a single support. Primarily, however, each switch comprises a lever member or movable contactor 20, pivotally supported upon a bracket 21, mounted upon the lower section of the panel board. The switch lever 20 is of bell crank form, having an arm 22 journalling at its end a roller 23 of insulating material for engagement with a cam fixed to a motor driven shaft 24. A second arm 25 of the lever 20 is arranged to pivotally carry a contact member 26, limited in its swing by a lug 27 extending from said contact member and engaging with a stop 28 formed on the lever arm 25 which also provides a seat for a spring 28ª engaging with the contact member 26. The contact member 26 has a contact shoe 29 fixed thereto for engagement with the stationary contact member 30 fixed to a bracket or support 31 mounted upon the panel board.

Each pilot or rheostat controlling switch is positively actuated by a specific cam fixed to the cam shaft 24, the cam being relatively arranged and of specific form for operating the switches in timed succession and determined duration.

One end of the cam shaft 24 is journalled in a bearing 35 mounted upon the second section of the panel board and its opposite end is engaged in bearings in the motor casing 36, the shaft within the casing having a worm wheel 37 fixed thereon, the worm wheel being engaged with a worm 38 upon the motor shaft 39 of the motor 40, which may be termed a pilot motor of small size single phase. The motor shaft 39, on its upper end has a friction disk 41 fixed thereto, the face of the friction disk being engaged by a friction block 42 mounted upon a lever 43. The lever 43 at one end is pivoted to a bracket 44 extending from the motor casing 36 and its opposite end is pivotally connected to a connecting rod 45. The connecting rod in turn is pivotally connected to an end of a swinging armature lever 46 actuated by the magnet 47 depending from the motor casing. The magnet is controlled to be energized as the motor current is cut off so as to brake the shaft against rotation.

*Multipolar switch.*

This switch mounted upon the lower panel and comprising a plurality of switch devices operated as a unit may be designated as a mulipolar switch to change the motor connections from the one running speed to the second, respectively as low and high. The switch as a unit is operated by a magnet actuating a rock shaft to which the various moving or swinging switch elements are connected. The motor connections through the switch are changed from low to high speed positions when the magnet is energized and from high to low when the magnet is deenergized by moving the car switch to the low speed position. Thus it may be said that the multipolar switch normally is always in its low speed position, so that the motor is always started on low speed. The high speed connections, however, are not made until the motor has accelerated enough to be ready to be changed over to the high speed.

The switch comprises two types of contacttors, three double throw and three single throw, with one of the single throw on an alternate side from the other single throw. The number of contactors is subject to modification for various makes of two speed motors. All of the movable contactors are mounted upon a rod 50 having its opposite ends journaled in a pair of brackets 51—51 fixed to the lower panel board. The rod is covered with insulation 52 and provided with insulator spacers 53 separating the movable contactors from one another. The double throw contactors of the series are the duplicate of one another, each comprising a body member or movable contactor 54 centrally engaged upon the rod 50 its opposite ends respectively pivotally supporting contact shoe carrying levers 55—55. Each lever has an arm thereof extending from one side of the lever axis and formed to receive a contact shoe 56 and a second arm extending from the opposite side of the lever to engage a stop lug 57 formed upon the body member 54. This lug also serves as a support for one end of a spring 58 interposed between the said lug and contact carrying lever for yieldingly restraining said lever. The contact shoes 56 as movable contactor members respectively are adapted to alternately engage with the shoes of a pair of stationary contactors 59, 59ᵃ respectively mounted upon the panel board at opposite ends of the movable contact carrying member. The two contact shoes on the movable or oscillating member 54 are electrically connected by a conductor strap 60 and by a flexible strap 61 having one end fixed to the stationary terminal screw 62 fixed upon the panel board. The single throw contactor or switch in structure is similar to the double throw switch except that the body member or contactor 54 is dimensioned for carrying only a single contactor lever 55, as shown in Fig. 7.

All of the movable switch elements are engaged by a rod 68 which engages through the body member 54 of the switches and insulated therefrom. This crank rod is covered with insulating material and carries insulator spacers inserted between the body members of the movable contactors.

One end of the rod 68 is connected to an arm of a crank lever 63 pivotally mounted upon an end of the movable contactor supporting rod 50, and the crank lever 63 has a second arm pivotally connected to the upper end of the armature lever 64. The armature lever is pivotally connected to the base structure 65 to which the magnet 66 is also secured. Thus when the magnet 66 is energized it will attract its armature lever 64 rocking the movable contactors to a change-over position to connect the motor on the high speed connections which continues in such position as long as the magnet 66 remains energized.

The movement of the armature lever 64 is limited in a detracted direction by a stop bar 67 fixed to the panel board with its free end angled to engage the upper end of the armature lever.

*Wiring diagram and operation of controller.*

The main switches A, B, C, each have a pair of movable contactors, each contactor represented as the arm 10 and spring pressed contact element 11 cooperating when the switch is closed with a stationary contact element 13 with which the leads of the main circuit lines are connected. Three main switches are employed for motor reversing or direction control, two thereof operative for each direction, the switch B working with either switches A and C, and switch A and C operative alternately, switch A in conjunction with switch B controlling say the up or forward direction control and switches C and B for the down or reverse direction control.

The main line lead or conductor 70 connects with the stationary contact element 13 for the movable contactor 10 of switch A. The conductor 70 also connects through a branch conductor 71 with the stationary element 13 for the movable contactor 10ᵃ of the switch C. A second main line lead or conductor 72 connects with the stationary contact element 13 for the movable contactor 10ᵃ of switch A and this conductor also connects with the stationary contact element 13 for the movable contactor 10 of the switch C through a branch conductor 73. A third main line lead or conductor 74 connects with the stationary contact element 13 for the movable contactor 10 of main switch B. These main line conductors at the switches are provided with magnetic blow-out coils 75 interposed in series circuit connection therewith to reduce arcing when the contactors are actuated in breaking the circuit.

The contactors 10 of the switches A and C are cross connected by a conductor 76 and likewise the contactors 10ª of both of said switches are cross connected by a conductor 77, for a motor direct reverse through the alternate operation of said switches.

The movable contactor 10 of switch A or movable contactor 10 of switch C connects with the movable contactor 54 of the motor speed change-over switch A' of the multipolar switch on the third panel section by a conductor 78. Movable contactor 10 of switch B connects with the movable contactor 54 of motor speed change-over switch B' by a conductor 79 and movable contactors 10ª of either switches A or C by a conductor 80 with the movable contactor 54 of the motor speed change-over switch C'.

The motor high speed control is always subsequent to a low speed control or always with the motor running approximately at its full low speed, therefore the motor will always start on low speed and then change to high speed, even though the car switch is thrown on starting immediately to high speed position. The type of motor employed for low speed does not require a starting resistance governed with the acceleration of the motor. Thus it is possible and permissible to reverse the motor on low speed from one direction to the reverse direction while running, which however cannot be permitted on the high speed, as the fuses would be blown and in time the motor would be damaged owing to the excessive current that it would take. When the motor is running on high speed and the car switch is moved from high speed to low speed to avoid any jerk or jar it is necessary to insert resistance to smooth out the deceleration. It is, therefore, desirable to insert a resistance with the low speed motor connection, cut out after a properly timed interval after the motor speed retards. In this capacity the resistance employed and its control differs from the employment and control of a motor starting resistance as disclosed in said aforesaid application, although functionally the principles may be regarded the equivalent, in providing a definite timing in the control whether from starting to full acceleration in a single speed motor requiring a starting resistance, or as in the instance herein, from high speed to low speed in a varying or plural speed motor. For the present purpose choke coils are thrown in series with the low speed connections and employed in place of resistance as it has been found that for resistance it requires four steps to smooth out the deceleration while only one step is required with choke coils. This leads to simplicity and reduction of cost.

For a low speed motor connection, the movable contractors 54 of the change-over switches A', B', C', respectively connect by conductors 81, 82, 83 with the movable contactors 20 of the resistance controlling switches R¹, R² and R³ on the second section of the panel board operated by the pilot motor. The conductor connection is also respectively with the choke coils 84—84—84 controlled by said movable contactors 20. The choke coils or resistance being short circuited or shunted when the contactors are closed. The movable contactors of said rheostat switch and choke coils connect through the stationary contacts 30 of said switches respectively by conductors 85, 86 and 87 to the motor or as shown herein, to appropriate terminals of a motor slate 88.

Thus for a low speed connection the circuit for the motor from the main switches leads through the change-over switches and rheostat switches. The high speed connections are made directly from stationary contact on the high speed side of the change-over switches by conductors 89, 90 and 91 with the appropriate terminals of the motor or motor slate 88, the high speed contact 59 for the contactors 54 of the change-over switches being at an opposite side for the low speed contact 59ª, adapting the contactors to alternately cooperate with said high and low speed contacts so that both sets cannot be engaged at the same time.

For the low speed down or one direction control, the control circuit is as follows: Starting at a terminal in the main line 70 a conductor 92 leads to the car switch 93 and from the car switch through a conductor 94 to the magnet windings 95 of main switch C, from said magnet windings by a conductor 96 connecting with the pilot switch P² through the movable and stationary contactors of said switch with the main line 74 through a conductor 97. The pilot switch P² for starting normally is closed which permits the circuit to be completed to energize the magnet of main switch C closing said main switch.

For the reverse direction control through the closing of main switch A, the control circuit follows from the main line 70, and conductor 92 to car switch the same as described for the first direction control or switch C, thence from car switch by conductor 98 to magnet windings 99 of the main switch A and from said windings by a conductor connecting with the conductor 96 to movable contactor of pilot switch P² and to the main line 74 by conductor 97. The movable contactor of the pilot switch must be closed before the magnet circuit of either switch A or C can be completed, the cams of the cam shaft operated by the pilot motor being in their normal or starting position.

When either main switch A or C is closed a circuit will be completed to the magnet windings 100 of the main switch B, the magnet winding connecting with respective cross conductors of the movable contactors of main switches A and C.

When the main switch B is closed the circuit to either of the magnets of the main switches A and C is complete through the movable contactor 10$^a$ of said main switch the control conductor 96 connecting with the terminal of said contactor; this maintains the circuit to either of said main switch magnet winding after the movable contactor of the pilot motor P$^2$ is in its open position for changing from low to high speed control.

The circuit for the pilot motor follows two paths depending on the position of the controller, relatively controlled by the pilot switches P$^4$ and P$^3$. When the car switch is moved to high speed position the circuit for the pilot motor follows from main line 70 conductor 92 to car switch thence from car switch by a conductor 102 to the stationary contact element of the pilot switch P$^4$ through movable contactor of said switch by conductor 103 to the pilot motor 104, from the motor by a conductor 105 which connects with main line conductor 74 through the control conductor 97, also connecting with the stationary contact of pilot switch P$^2$. The winding 106 of the pilot motor brake magnet connects in parallelism with the conductors 102 and 105 for releasing the brake simultaneous with completing the circuit to the pilot motor. The pilot switch P$^4$ controls and governs the cutting off of the pilot motor after the motor high speed control has been effected.

When the car switch is moved from high speed to low speed position or neutral the pilot motor circuit follows the second path commencing from the main line 70, conductor 92, conductor 108, leading down to the change-over switch C$^2$ and connecting with the stationary contact of said switch, thence through the movable contactor 54. From the movable contactor the circuit continues through conductor 109 connecting with said contactor and with the stationary contact of pilot switch P$^3$ from which the circuit leads to the pilot motor through the conductor 103 connecting with the movable contactors of switches P$^4$ and P$^3$, and from the pilot motor the same as previously described by conductors 105—97 to main line 74.

The pilot motor and the control switches on the middle panel come only into play when the car switch is moved to the high speed position and when the car switch is returned to the low speed or neutral position. The pilot switch P$^3$ besides functioning to control pilot motor when the car switch is moved from high speed to low speed position or neutral will always maintain a pilot motor circuit to reinstate the control to a starting position regardless of what position the controller was in when the car switch was thrown to neutral.

The pilot switch P$^1$ controls the circuit to the windings 110 of the magnet 66 operating the multipolar switch or change-over switches, making it necessary that the movable contactor of the pilot switch P$^1$ be closed before the circuit can be completed to the windings of said magnet 66. The circuit for the windings of the magnet 66 is as follows: Commencing with the main line 74 through the movable contactor 10$^a$ of main switch B, conductor 96 which connects with said contactor 10$^a$ of main switch B and also the magnet windings of main switch C, through the movable contactor of said pilot switch P$^1$, conductor 111 to the magnet windings 110 of magnet 66, thence through conductor 112 leading to the car switch 93, conductor 92, to the main lead 70.

Normally for starting the motor the cam shaft is in a position as shown in the wiring diagram (Figure 8) with the movable contactors of switch R$^1$ R$^2$ and R$^3$ in their circuit closing positions, as well as pilot switches P$^2$ and P$^4$. The change-over switch likewise in a position for the low speed main circuit connection, the said switches remaining in such position if only operated for low speed. As soon as the car switch is thrown from low speed to high speed position, a controlling circuit is established through pilot switch P$^4$ starting the pilot motor, rotating the cam shaft, resulting in operating pilot switch P$^2$ to allow it to break its circuit control for either of the magnets of the main switches A and C circuit to said magnets continuing through main switch B. This prevents a high speed reversing control until after the cam shaft has made a complete cycle or reinstatement to starting position. Following the actuating of pilot switch P$^2$, pilot switch P$^1$ is actuated to move the same in its closed position and when closed completes circuit to the magnet 66 of change-over switch moving this switch to its high speed position, after which the pilot switch P$^4$ is released breaking the circuit to the pilot motor. At such period the cam operating the resistance controlling switches R$^1$, R$^2$ and R$^3$, has released the movable contactors so that the choke coils 84 will be in circuit connection when the car switch is thrown to low speed or neutral. Pilot switch P$^3$ will, however, have been moved to its closed position for pilot motor control as soon as the change-over switch is in its normal or slow speed position. Therefore, when the control is in high speed position switches P¹ and P³ are closed and switches P² and P⁴ open, as well as the resistance controlling switches R¹, R², and R³.

As soon as the car switch is moved off of its high speed position the circuit to magnet 66 of the change-over switch is broken. This switch moving automatically to its low speed position when its magnet 66 is deenergized completes the pilot motor circuit through pilot switch P³ which is closed for operating the pilot motor for rotating the cam shaft a part of a revolution for re-instating the cams to their starting or initial position following with the release of the pilot switch P³. Making a change from high to low the choke coils are in circuit for a proper period required for the deceleration of motor speed, governed by the release control of the cams of the switches R¹, R² and R³ after which these switches are again closed. Should the operator throw the car switch from one high speed position to a reverse high speed position, such control would not be immediately effective but only after a restoration period of the pilot switches and their subsequent actuation for high speed control which is automatic beyond the control of the operator. This provides a safety feature necessitating a slowing down or stopping of the main motor before reversing. The pilot switch P² is only closed when the pilot devices are in their reinstated or starting position so that any attempt to quickly reverse the direction of the main motor on high speed is impossible, for the pilot devices cannot be immediately placed in their starting position as a given cycle of control must take place and as soon as the main switches are broken they cannot be reset until the pilot devices are in their normal or starting position, because the magnet circuit of the main switch is controlled initially through one of the pilot switches. The cams are of a form and relatively set for a proper timing and non-interference. Pilot switch P² closes when pilot switch P³ opens, and likewise the reverse, so that it is not possible for the controller to get in a position in which the motor cannot be started.

The cams are fixed to the cam shaft but are adapted to be adjusted about the shaft for regulating the same relatively to set the timing of the various devices controlled by the cam shaft.

The pilot motor is preferably of a special type designed for elevator motor controlling service, and has a continuous direction of rotation and controlled to operate the cam shaft in two stages to a single cycle, one for a control from low speed to high speed, and the second upon the return from high to low speed for a control of the resistance and a restoration of the pilot devices.

The motor will come quickly to rest when the current is cut off so as not to overrun, and to insure positive stopping. The magnetically operated brake applies a braking pressure to the motor shaft as soon as the current is shut off. The magnet holds the brake in released position as long as the current is supplied to the pilot motor.

The change-over switch is shown as provided with switch devices 113, 113, operated on the high speed side which in this instance operate to short circuit motor connections or transform the motor connection for high speed results, and their use and circuit control depend upon the make of the two speed motor employed and variations would possibly have to be made to meet the particular motor requirements, and therefore may be recognized as a part of the motor separate and distinct from the present invention. The change-over switch in detail and its number of contactors may be regarded as subsidiary, except possibly as to the features herein particularly set forth, and a part of the combination of the controller.

Having thus described my invention what I claim is:

1. In an electric circuit controller for plural speed motors, a plurality of magnetically operated main circuit switches for motor direction circuit control, a magnetically operated switch for motor speed change control, mechanically actuated switch devices for controlling electric circuits for operating a pilot motor and said magnetically operated switches, and a pilot motor, a shaft rotated in one direction by said pilot motor, and cams mounted on said shaft, one for each of said mechanically actuated switch devices for operating said devices in a determined and timed order for each revolution of said shaft.

2. In an electric circuit controller for plural speed motors, magnetically operated contactors for main circuit motor controlling and reversing, magnetically operated switch devices for motor speed change control, mechanically actuated switch devices for controlling electric circuit for a pilot motor and said magnetically operated contactor and switch devices, a pilot motor for operating said mechanically actuated switch devices, a resistance for the motor adapted to be connected in circuit with the motor in changing from a high motor speed to a lower speed, and mechanically operated switch devices for controlling said resistance operated by said pilot motor.

3. In an electric circuit controller for plural speed motors, a controller for controlling the electric circuits to the motor for plural speed motor operation, resistance adapted to be connected in the motor circuit when changing the motor control from a high motor speed to a lower motor speed, and switch devices for cutting in and out said resistance coordinately with said speed change motor control, a pilot motor for actuating said switch devices, and controller devices for controlling the circuit to said pilot motor actuated by said pilot motor.

4. In an electric circuit controller for plural speed motors, main circuit controlling switches for motor direction circuit control, a magnetically operated switch for motor speed change control, a manually operated switch for motor starting, reversing and speed change control, a plurality of mechanically operated circuit controlling switches for main circuit switches, speed change switch and pilot motor, and a pilot motor for operating said mechanically operated switches effective upon the operation of said manually operated switch to a speed change position, whereby a definite automatic motor control is obtained in changing from a higher speed to a lower and from one direction to a reverse.

In witness whereof, I hereunto subscribe my name.

ARTHUR J. LIEBENBERG.